United States Patent
Zhang et al.

(10) Patent No.: US 7,791,904 B2
(45) Date of Patent: Sep. 7, 2010

(54) INDUCTANCE-VOLTAGE CLAMPING FULL-BRIDGE SOFT-SWITCH CIRCUIT

(75) Inventors: Huajian Zhang, Shenzhen (CN); Yanfeng Li, Shenzhen (CN); Yonggang Ru, Shenzhen (CN)

(73) Assignee: Emerson Network Power Energy System AB, Stockholm (SE)

( * ) Notice: Subject to any disclaimer, the term of this patent is extended or adjusted under 35 U.S.C. 154(b) by 181 days.

(21) Appl. No.: 11/794,848

(22) PCT Filed: Jan. 6, 2006

(86) PCT No.: PCT/CN2006/000011

§ 371 (c)(1),
(2), (4) Date: Apr. 22, 2008

(87) PCT Pub. No.: WO2006/072218

PCT Pub. Date: Jul. 13, 2006

(65) Prior Publication Data

US 2009/0097279 A1  Apr. 16, 2009

(30) Foreign Application Priority Data

Jan. 8, 2005 (CN) .................. 2005 1 0006046

(51) Int. Cl.
H02M 3/335 (2006.01)
(52) U.S. Cl. .................. 363/17; 363/56.03; 363/132
(58) Field of Classification Search ............. 363/56.02, 363/56.03, 56.05, 98, 132, 17

See application file for complete search history.

(56) References Cited

U.S. PATENT DOCUMENTS

| 4,482,946 | A | * | 11/1984 | Bhagwat ................. 363/136 |
| 4,600,411 | A | * | 7/1986 | Santamaria ................. 96/82 |
| 5,198,969 | A | | 3/1993 | Redl et al. |
| 5,483,125 | A | * | 1/1996 | Kachmarik et al. ......... 315/106 |
| 6,466,459 | B1 | | 10/2002 | Guerrera et al. |
| 6,563,723 | B2 | * | 5/2003 | Nadot et al. ................. 363/57 |
| 6,650,551 | B1 | | 11/2003 | Melgarejo et al. |
| 6,987,675 | B2 | * | 1/2006 | Jovanovic et al. ......... 363/21.01 |
| 7,092,259 | B2 | * | 8/2006 | Jacobs ...................... 363/20 |
| 2003/0002304 | A1 | * | 1/2003 | Zhu et al. .................. 363/56.02 |

FOREIGN PATENT DOCUMENTS

CN  1455509  11/2003

* cited by examiner

Primary Examiner—Jeffrey L Sterrett
Assistant Examiner—Fred E Finch, III
(74) Attorney, Agent, or Firm—Harness, Dickey & Pierce, P.L.C.

(57) ABSTRACT

An improved inductance-voltage clamping full-bridge soft-switch circuit including a full-bridge converter, a transformer, an output rectifying unit, an inductor, a clamping resistor, a capacitor, a first clamping diode, and a second clamping diode. The inductor includes a first winding used as an auxiliary inductor and a second winding used for clamping. A capacitor is connected in parallel with the clamping resistor connected in series.

2 Claims, 5 Drawing Sheets

INDUCTANCE-VOLTAGE CLAMPING FULL-BRIDGE SOFT-SWITCH CIRCUIT

TECHNICAL FIELD

The present invention relates to a full-bridge soft-switch circuit and to a full-bridge soft-switch circuit having an inductance-voltage clamp.

BACKGROUND

In a conventional full-bridge soft-switch circuit, because of the advantages of a simple circuit and control, soft switch being achieved easily by switch, high circuit efficiency, low EMI, etc., soft-switching has been widely used in the area of converters. However, because an auxiliary inductor is added therein, a diode may cause a relatively large voltage spike and oscillation during the reverse recovery of a diode at the secondary side, thereby increasing the loss of a diode switch such that the EMI of circuit increases. If boosting the withstand voltage of diode, the reverse recovery time of diode will be longer which makes circuit performances even worse.

In order to eliminate the influence caused in the recovery of a backward diode so as to enhance the circuit reliability, Chinese Patent Application No 03114296.6, titled "Soft Switch Full-bridge Phase-shift Circuit with Resonant Inductance Voltage Clamp", (inventors: Zhang Huajian, Lv Minghai, Wang Guoyong, Huang Boning, Publication Date: Nov. 12, 2003) discloses a novel resonant inductance voltage clamping soft switch full-bridge phase-shift circuit. It uses the clamping winding of a resonant inductor to resolve the problems caused during reverse recovery of an output diode such that the circuit, while maintaining the inherent soft switch characteristics of full bridge circuit, greatly reduces oscillations caused by the reverse recovery of the output diode. In a present configuration, as shown in FIG. 1, a resonant inductance branch connects a resistor Rc in series. Rc in series ensures that the circuit, during each switch cycle, consumes extra energy of the resonant inductor and eliminates the influence caused by the recovery of a backward diode, and ensure that the clamping diodes D5 and D6 are zero current switches. In this way, it can enhance the reliability of the clamping circuit considerably. However, the current stress di/dt or voltage stress dv/dt on the added resistor Rc is relatively large, and the peak is relatively high, such that there are certain effects against the reliability of resistor Rc. For the clamping resistor Rc, the average energy needed to be consumed in whole procedure is substantially definite, and is determined by the characteristics of the entire circuit. The average loss of the resistor can meet requirements under selected conditions, but instantaneous power is different. In particular, at the instant of conducting current, the instantaneous power is very large, while when the current is zero, the resistor has no loss. Resistor instantaneous stress is an important factor for both the selection and lifetime of resistors. If the instantaneous power of a resistor is excessively large it will reduce the lifetime of the resistor, and potentially damage the resistor. Therefore, in the situation of maintaining total loss unchanged, it is desired that the instantaneous power is as lower as possible.

SUMMARY

An improved inductance-voltage clamping full-bridge soft-switch circuit resolves the technical problems in the prior art and reduces the instantaneous current or instantaneous power of the clamping resistor and enhances the reliability of the resistor.

An improved inductance-voltage clamping full-bridge soft-switch circuit, comprising a full-bridge converter, a transformer, an output rectifying unit, an inductor, a resistor, a first clamping diode and a second clamping diode. Leading bridge arms and lagging bridge arms of the full-bridge converter are connected to positive and negative input buses respectively. The inductor includes a first winding used as an auxiliary inductor and a second winding used for clamping. The primary side of the transformer is connected to the first winding in series and then to the middle point of the leading bridge arms and lagging bridge arms of the full-bridge converter. The two ends of the secondary side of the transformer are connected to the output rectifying units respectively. The first end of the second winding connects the first winding at one side close to the middle point of the leading bridge arms of the full-bridge converter, and the second end of the second winding connects the resistor in series, and then clamps on the positive and negative input buses via the first clamping diode and the second clamping diode respectively. The circuit further comprises a capacitor connected to the two ends of the resistor in parallel.

The capacitor and the resistor connected thereto meet the following formula: Rc×Cs<T/6, wherein T is the switch cycle of the circuit.

The represent invention has the advantage of improving the current stress di/dt or voltage stress dv/dt on the clamping resistor because of the capacitor. Depending on the shunt of the capacitor, the pulse current of the clamping resistor is smoothed and instantaneous strike power is reduced without adversely affecting the other performances of the circuit so as to enhance the reliability of the resistor, and thereby increasing the reliability of the entire circuit.

The characteristics and advantages of the present invention are more appreciated in connection with the following detailed description taken in conjunction with the accompanying drawings.

DETAILED DESCRIPTION

Figure 1:
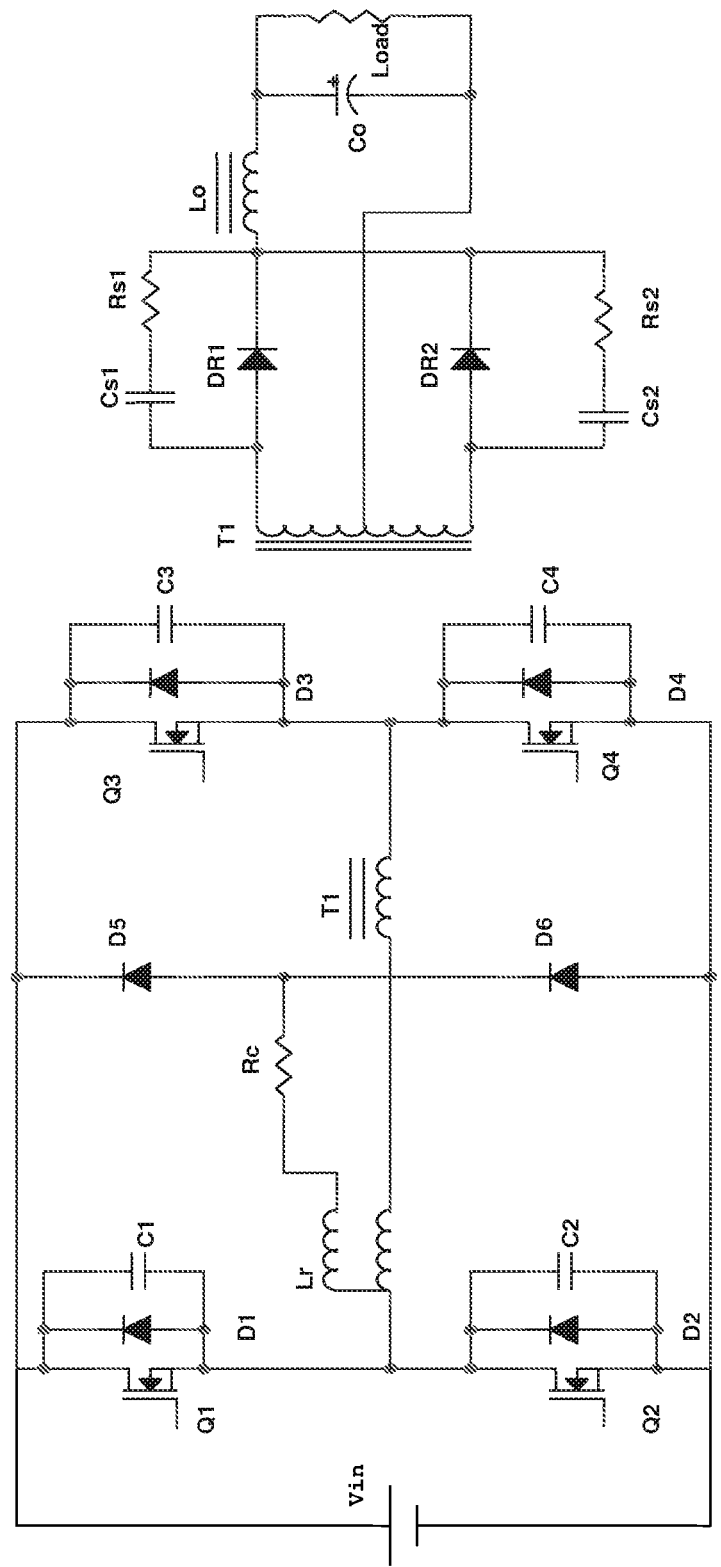
FIG. 1 is a inductance-voltage clamping full-bridge phase-shift soft-switch circuit of the prior art.
Figure 2:
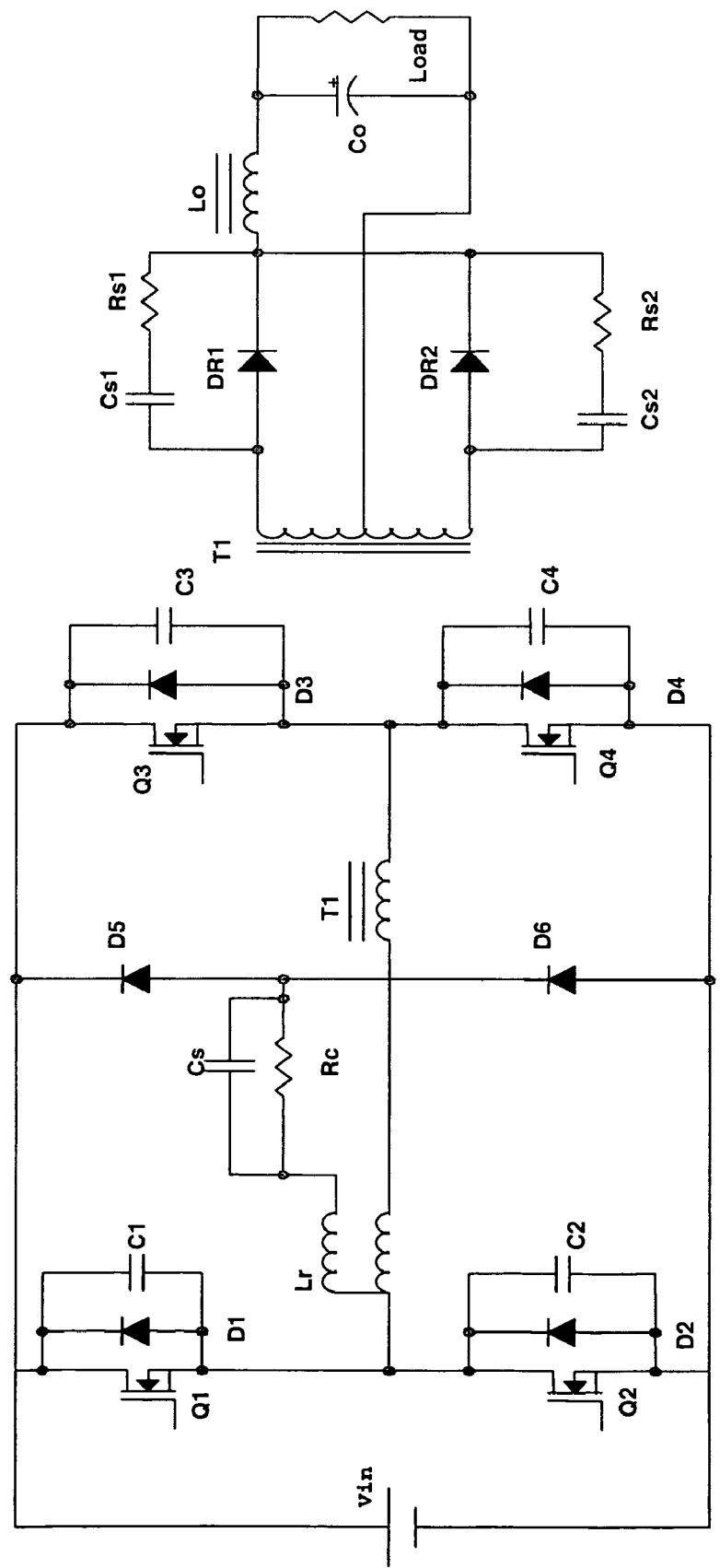
FIG. 2 is a circuit diagram of the inductance-voltage clamping full-bridge phase-shift soft-switch circuit according to various embodiments.

FIG. 2 shows a phase-shift full-bridge clamping soft-switch circuit having an inductance-voltage clamp added onto a conventional phase-shift full-bridge soft-switch circuit. Leading bridge arms Q1, Q2 and lagging bridge arms Q3, Q4 of full-bridge converter are connected to positive and negative input buses, respectively. Inductor Lr includes a first winding functioning as an auxiliary inductor and a second winding for clamping. The primary side of a transformer T1 is connected to the first winding in series, and then to the middle point of the leading bridge arms Q1, Q2 and lagging bridge arms Q3, Q4 of the full-bridge converter. Two ends of the secondary side of the transformer T1 are connected to an output rectifying circuit. The output rectifying circuit generally is a diode rectifying circuit, and in various embodiments, the output rectifying circuit includes output diodes DR1, DR2. The anodes of the output diodes DR1, DR2 are connected to the two ends of the secondary side of the transformer T1, respectively. The cathodes and the middle tap of the secondary side of the transformer T1 are connected to a filter unit and then to a load. One end of the second winding connects the first winding at one side close to the middle point of the leading bridge arms Q1, Q2 of the full-bridge converter, and another end of the second winding connects the resistor Rc in series, and then connects to the first clamping diode D5 and reversely connects to the second clamping diode D6, respectively, The other ends of clamping diodes D5 and D6 clamps on the respective positive and negative input buses. A capacitor Cs is connected to the two ends of the resistor Rc in parallel. The resistor Rc is called as a clamping resistor Rc because it clamps.

Figure 3:
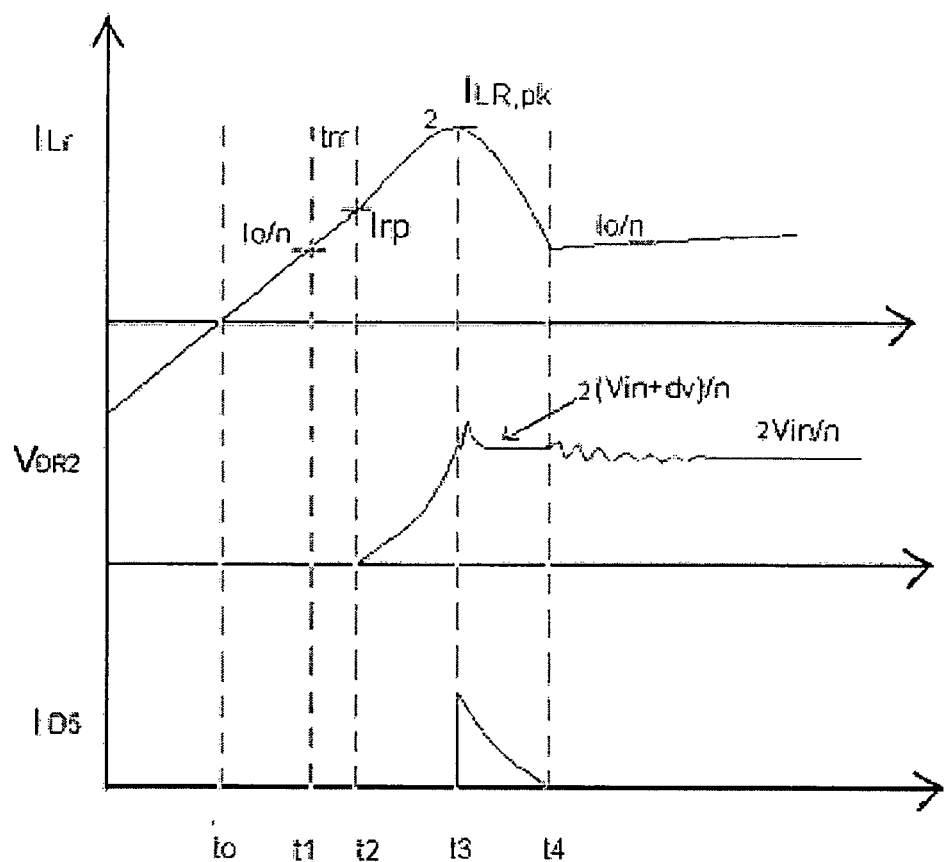
FIG. 3 depicts waveforms of diode D5, output diode DR2 and resonant inductor Lr during the reverse recovery of the output diode in the inductance-voltage clamping full-bridge phase-shift soft-switch circuit.
Figure 4:
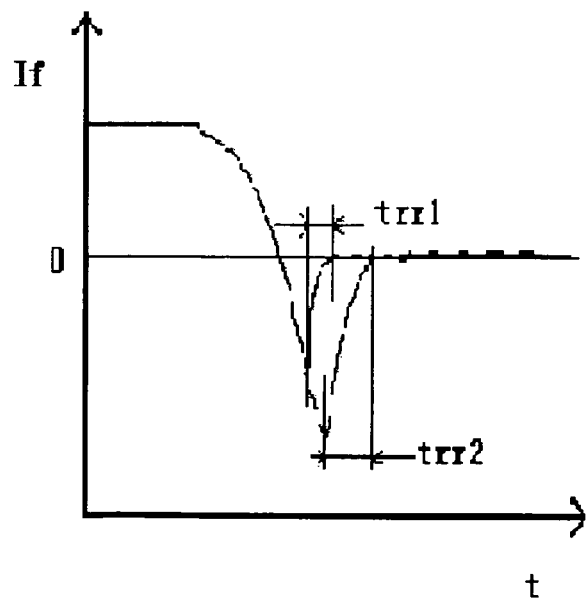
FIG. 4 depicts a reverse recovery characteristic diagram of a diode.
Figure 5:
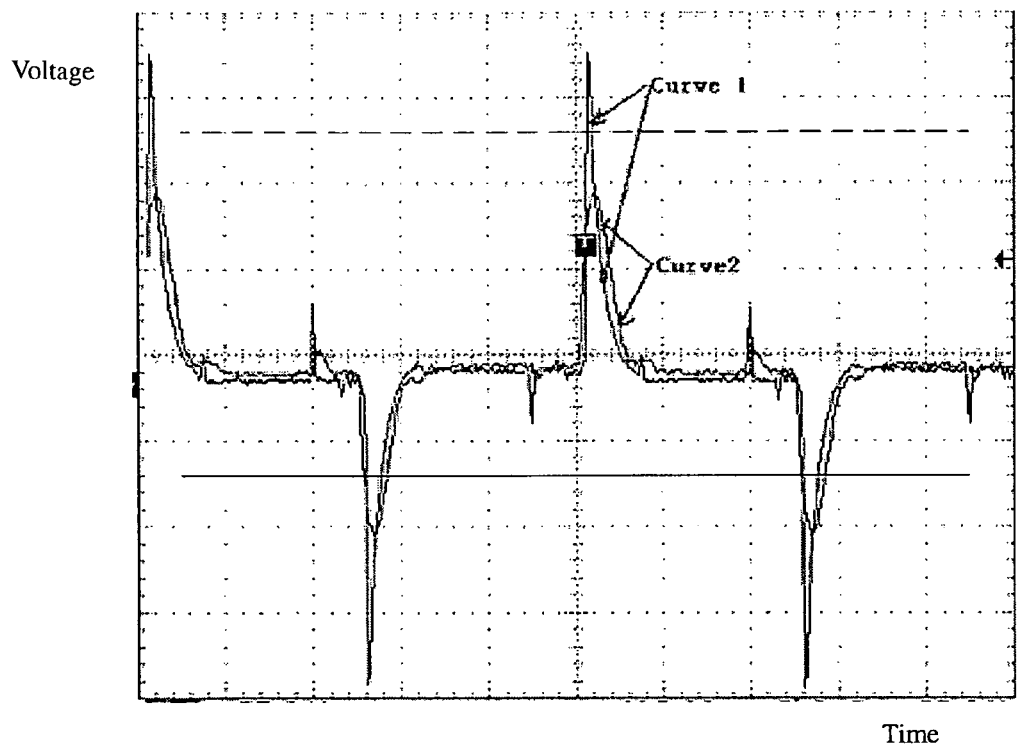
FIG. 5 depicts a waveform of the voltage on the clamping resistor before and after adding a capacitor.

The following is the further analysis regarding the capacitor Cs improving the reliability of the resistor Rc by reference to FIGS. 3-5.

FIG. 3 shows main voltage current waveforms of the clamping circuit thereof. When the current ILron the first winding reaches a peak, the output voltage VDR2 of the output diode DR2 also has a peak. Accordingly, on the first clamping diode D5, the current ID5 thereof has a pulse at first and then decays to zero gradually. This current inevitably flows through the clamping resistor Rc such that the clamping resistor Rc also has a pulse current thereon. The peak of the pulse current is:

$$I_{d5,pk} = \sqrt{I_{rp}^2 + \left(\frac{V_{in}}{Z_{rr}}\right)^2}$$

Wherein:

$$I_{rp} = \frac{I_0}{n} + \frac{V_{in} * t_{rr}}{Lr'};$$

Io is a load current;

n is transformation ratio of the primary and secondary sides;

Lr' is the resonant inductance quantity of the first winding;

trr is the reverse recovery time of the output diodes DR1, DR2;

Vin is the input voltage of the bus; and $$Z_{rr} = \sqrt{\frac{Lr'}{Cs'}};$$

wherein Cs' is circuit equivalent parasitic capacitance and absorbing capacitance converted for the primary side of the transformer T1.

When the reverse recovery of the output diodes DR1, DR2 ends, this current transfers to the clamping circuit quickly. The current rise of the clamping circuit depends on the reverse recovery characteristics of the output diodes DR1, DR2. The extra current of the output diodes DR1, DR2 starts to transfer to the clamping circuit during the reduction of the reverse recovery current. A normal diode has a relatively precipitous curve in the period of current reduction during the reverse recovery. As shown in FIG. 4, the reverse current in the reverse recovery characteristics of the normal diode drops quickly, such as, trr2 less 0.4×trr generally. For the quick recovery diode, the reverse current of the diode drops even more quickly, such as the quick recovery diode (FRED) in FIG. 4 which has a smaller trr1 time. Thus, the current is transferred to the clamping circuit more quickly, and the initial current pulse on the clamping resistor Rc will be more precipitous and higher. After the current on the resistor Rc reaches the largest value, the clamping current decays to zero gradually as the resistor energy losses.

Since there is a capacitor Cs connected in parallel with resistor Rc, most of the pulse current is shunted from the capacitor Cs initially because Cs is a high frequency capacitor, so that the current on the resistor Rc is reduced greatly at turn on. Because the voltage is boosted after the capacitor Cs is charged, the current is transferred to the resistor Rc gradually. Thus, the instantaneous current on the resistor Rc will be greatly smoothed, and instantaneous inrushing power is reduced greatly.

Figure 6:
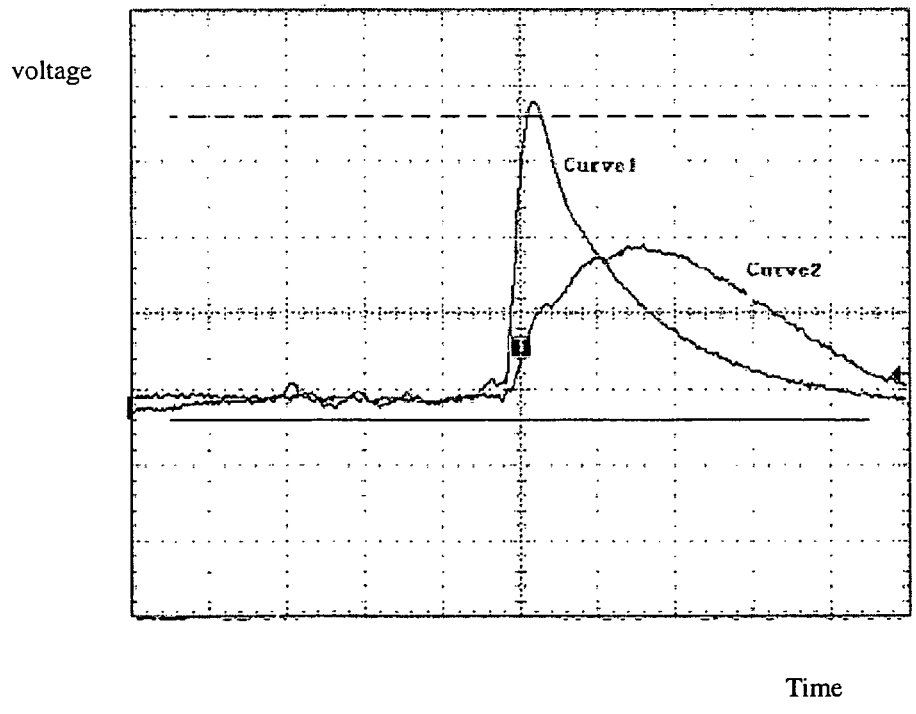
FIG. 6 is an expanded waveform of the voltage on the clamping resistor before and after adding the capacitor.

FIG. 5 shows the voltage waveform on the resistor Rc before and after adding a capacitor in real applications. Curve1 is the voltage waveform of the resistor Rc without capacitor Cs; Curve2 is the voltage waveform of the resistor Rc with capacitor Cs. It can be seen from FIG. 5 that the peak voltage has dropped from 95.5V to 53.5V; and the instantaneous maximum power is reduced to around 30%. The expanded voltage waveform of the clamping resistor of FIG. 6 can be obtained by expanding the waveforms of FIG. 5. It can be seen that, with the addition of capacitor Cs, the voltage of the clamping resistor Rc becomes smoother, and the current peak is reduced greatly. This indicates fully that capacitor Cs greatly reduces voltage current stress on clamping resistor Rc.

However, not every capacitor can achieve the purpose of the various embodiments. After the capacitor Cs is connected to the two ends of the resistor Rc in parallel, if the capacitance value is excessively large, the first clamping diode D5 and the second clamping diode D6 will remain on continuously, that is, diodes D5 and D6 will not turn off within the ½ switch period, resulting in a short across the diodes. For example, for clamping diode D5, if the switch Q2 of the leading bridge arm turns on when the first clamping diode D5 has not turned off yet, the first clamping diode D5 and the switch Q2 form phenomenon short, resulting in the damage of the first clamping diode D5 and the switch Q2. Thus, the capacitance cannot be too large. Also, the resistance value of the resistor Rc cannot be too small. If the resistor Rc has a too small resistance value, it will cause the first clamping diode D5 and the second clamping diode D6 to remain on. Thus, it is necessary for the capacitor Cs and the resistor Rc to meet Rc×Cs<T/6, wherein T is the switch period of the circuit, that is, the product of the capacitance value of the capacitor Cs and the resistance value of the resistor Rc is less than ⅙ switch period.

Figure 7:
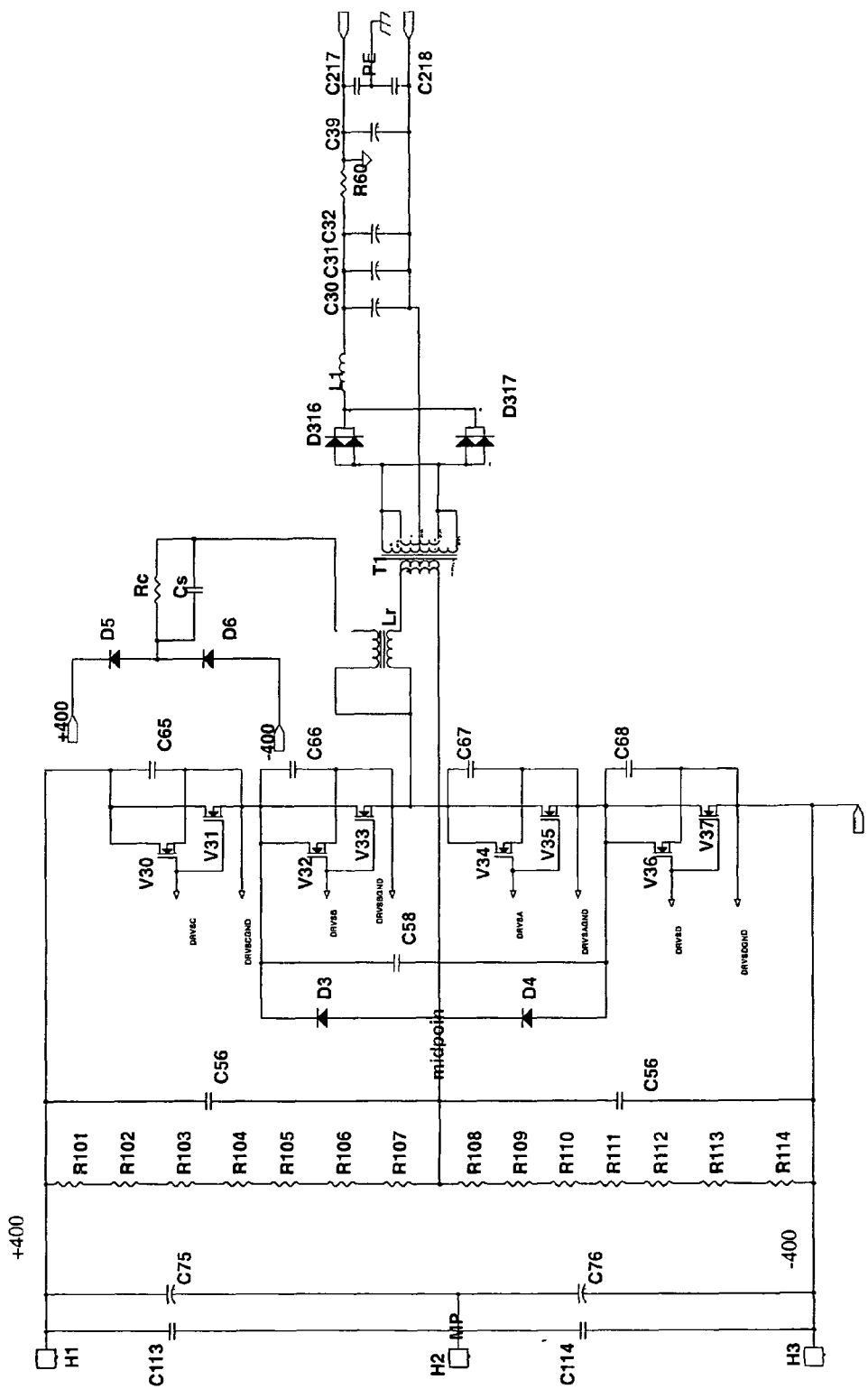
FIG. 7 is a circuit diagram of the inductance-voltage clamping full-bridge soft-switch circuit according to another embodiment.

FIG. 7 shows various embodiments of an inductance-voltage clamping full-bridge phase-shift soft-switch circuit in a three-level circuit. Lagging bridge arms V32, V33, V34, V35 and leading bridge arms V30, V31, V36, V37 of a full-bridge converter are connected to positive and negative input buses H1, H3, respectively. An inductor Lr comprises a first winding used as an auxiliary inductor and a second winding used for clamping. The primary side of a transformer T1 is connected to the first winding in series, and then to the middle point of the lagging bridge arms V32, V33, V34, V35 and the leading bridge arms V30, V31, V36, V37 of the full-bridge converter. Two ends of the secondary side of the transformer T1 are connected to output rectifying units D316, D317, respectively. The anodes of the output rectifying unites D316, D317 are connected to the two ends of the secondary side of the transformer T1, respectively. The cathodes and the middle tap of the secondary side of the transformer T1 are connected to a filter unit and then to a load. The first end of the second winding is connected to an end of the first winding. A second end of the first winding connects to the middle point of the lagging bridge arms V32, V33, V34, V35 of the full-bridge converter. The second end of the second winding connects the resistor Rc in series, and then connects to the first clamping diode D5 and to the second clamping diode D6, respectively. The other ends of diodes D5 and D6 connect to respective positive and negative input buses H1, H3. A capacitor Cs is connected to the two ends of the resistor Rc in parallel.

The various embodiments can greatly reduce the instantaneous current stress on the clamping resistor by connecting a capacitor in parallel to the clamping resistor connected in series so as to enhance the reliability of the clamping resistor and improve the reliability of the entire of the circuit. Thus, it can be referred to as an improved inductance-voltage clamping full-bridge soft-switch circuit, and the capacitor is also called as an absorbing capacitor because of its absorption of the pulse current on the resistor.

The invention claimed is:
1. An inductance-voltage clamping full-bridge soft-switch circuit, comprising:
a full-bridge converter;
a transformer;
output rectifying units;
an inductor;
a resistor;
a first clamping diode and a second clamping diode,
wherein leading bridge arms and lagging bridge arms of said full-bridge converter are connected to positive and negative input buses, respectively, said inductor including a first auxiliary inductor winding and a clamping second winding, a primary side of said transformer connected to the first winding in series, and then to a middle point of the leading bridge arms and lagging bridge arms of the full-bridge converter, two ends of a secondary side of the transformer being connected to the output rectifying units, respectively, a first end of the second winding connecting to the first winding at a side close to the middle point of the leading bridge arms of the full-bridge converter, and a second end of the second winding connecting to the resistor in series, and the clamping diodes on the positive and negative input buses via the first clamping diode and the second clamping diode, respectively, and
a capacitor connected to the two ends of the resistor in parallel, wherein the capacitor and resistor are selected in accordance with the period of the circuit and as a product of the value of each.
2. The inductance-voltage clamping full-bridge soft-switch circuit as defined in claim 1, wherein the capacitor and resistor are defined by a formula: (resistor value multiplied by the capacitor value)<T/6, wherein T is a switch cycle of the circuit.

* * * * *